United States Patent [19]

Lehmann

[11] 4,090,282
[45] May 23, 1978

[54] DEFLECTION CONTROL DEVICE

[75] Inventor: Rolf Lehmann, Rudolfstetten, Switzerland

[73] Assignee: Escher Wyss Limited, Zurich, Switzerland

[21] Appl. No.: 841,705

[22] Filed: Oct. 13, 1977

[30] Foreign Application Priority Data

Oct. 19, 1976 Switzerland ............... 013205/76

[51] Int. Cl.² ........................................... B21B 13/02
[52] U.S. Cl. ............................................. 29/116 AD
[58] Field of Search ................. 29/116 AD, 113 AD

[56] References Cited

U.S. PATENT DOCUMENTS

| 3,119,324 | 1/1964 | Justus | 29/116 AD X |
| 3,802,044 | 4/1974 | Spillman et al. | 29/113 AD |
| 3,869,774 | 3/1975 | Gallant | 29/116 AD |
| 3,879,827 | 4/1975 | Lehmann | 29/116 AD |
| 3,990,935 | 11/1976 | Lehmann | 29/116 AD X |
| 4,023,480 | 5/1977 | Biondetti | 29/116 AD X |
| 4,047,273 | 9/1977 | Biondetti | 29/116 AD |

*Primary Examiner*—Alfred R. Guest
*Attorney, Agent, or Firm*—Robert A. Ostmann

[57] ABSTRACT

Deflection control device, having a stationary supporting member; said supporting member comprising a series of hydrostatic supporting elements; said device also having a shell movable transversely in relation to the series of said supporting elements; ducts being provided in said supporting member for supplying or discharging pressure fluid for said supporting elements; a partition wall separating two of said ducts from one another; the position of said partition wall being variable along the series of said supporting elements.

12 Claims, 16 Drawing Figures

DEFLECTION CONTROL DEVICE

BACKGROUND OF THE INVENTION

The invention relates to a deflection control device having a stationary supporting member comprising a series of hydrostatic supporting elements, and in the supporting member there are provided ducts for supplying or discharging pressure fluid for the supporting elements, two ducts being separated from one another by a partition wall.

A deflection control roll of this kind is known from U.S. Pat. No. 3,802,044, issued Apr. 9, 1974 FIG. 8. In that known roll, bores are provided in the supporting member which are associated with the individual hydrostatic supporting elements and through which the pressure fluid is supplied to the supporting elements. In that case, portions of the supporting member form the partition walls, through which the ducts associated with the individual supporting elements are separated from one another.

It has been proposed in U.S. patent application Ser. No. 738.561 filed Nov. 3, 1976 now U.S. Pat. No. 4,047,273, issued Sept. 13, 1977 to form the ducts for supplying the pressure fluid for the supporting elements by coaxial tubes which are situated in a bore of the supporting member and comprise at their ends in each case a partition wall, which separates two adjacent ducts from one another and abuts in a sealing-tight manner on the wall of the bore.

In the case of the aforesaid constructional arrangements, when the supply to the supporting elements in the series is to be variable from one supporting element to another, it is necessary to provide a separate duct for the pressure fluid in the supporting member for each supporting element, and a suitably comprehensive control device is required for controlling the pressure fluid in the ducts.

SUMMARY OF THE INVENTION

The invention has as its object to provide a deflection control device with which pressure fluid supply can be varied from supporting element to supporting element in a simpler manner and in such a way as to take up relatively little space in the supporting member.

In a deflection control device of the type initially described, this object is achieved according to the present invention in that the position of the partition wall along the series of supporting elements is variable.

Advantageously the position of the partition wall is variable by displacement of the partition wall along the series of supporting elements.

Advantageously the partition wall can be secured on an insert element introduced into the supporting member, and the position of the partition wall can be varied by intechanging the insert element for another insert element with a different position of partition wall.

It is also advantageous if the partition wall is arranged on an insert element introduced into the supporting member, and can be displaced after the insert element is removed.

BRIEF DESCRIPTION OF THE DRAWING

Constructional examples of the subject of the present invention are shown in a simplified manner in the drawings, by means of which the invention will be explained in detail. In these drawings

DESCRIPTION OF THE PREFERRED EMBODIMENTS

Figure 1:
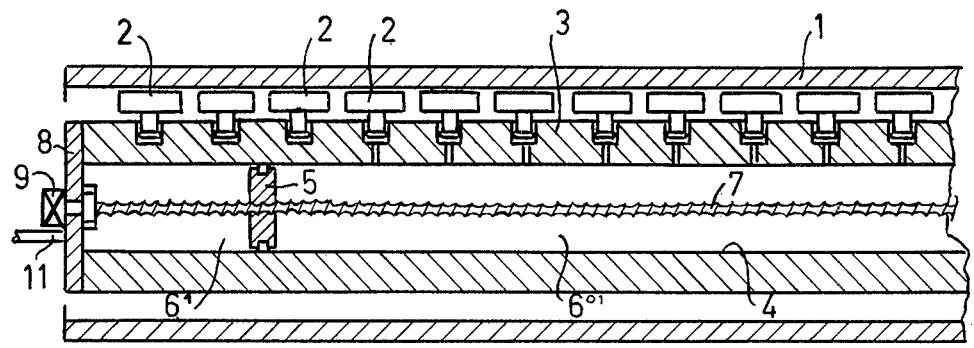
FIG. 1 shows a vertical axial section through a deflection control roll.
Figure 2:
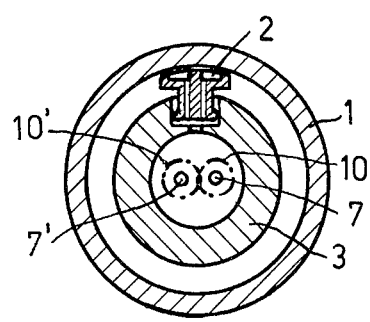
FIG. 2 shows a section taken on the line II—II of FIG. 1.

In the constructional example of a deflection control device shown in FIGS. 1 and 2, that is to say a deflection control roll, a shell 1 is adapted to be supported by a series of supporting elements 2 which are arranged in a supporting member 3. Situated in the supporting member 3 is a bore 4 with a partition wall 5 wich divides the bore into a duct $6^1$ and a duct $6^{01}$.

The position of the partition wall 5 can be varied along the series of supporting elements 2. For this purpose the partition wall 5 can be displaced along the series of supporting elements 2.

The displacement of the partition wall 5 is effected by means of a rod, that is to say by means of a screwthreaded spindle 7, which is mounted axially in a cover 8 of the supporting member 3, and engages in a screwthreaded bore of the partition wall 5. The screwthreaded spindle 7 can be rotated from the outside by means of a square head 9.

As FIG. 2 shows, there is also provided adjacent the screwthreaded spindle 7 a second screwthreaded spindle 7' which has a screwthread of the same pitch but in the opposite direction of rotation. Each of the screwthreaded spindles 7 and 7' carries an equally large gear wheel 10 and 10' respectively, these gear wheels being in engagement with one another. The arrangement avoids rotation of the partition wall 5 when the screwthreaded spindle 7 rotates. But the partition wall 5 could also be prevented from rotation in some other way, for example by providing a longitudinal wedge in the bore 4 or by replacing the screwthreaded spindle 7' by a cylindrical rod secured in the cover 8.

The duct $6^1$ is connected by means of a pressure conduit 11 to a source of pressure medium not shown here. The duct $6^{01}$ on the other hand, is connected to an outlet which is not specifically designated in the drawings. By displacement of the partition wall 5 the working width of the deflection control roll can be modified. Thus the supporting elements 2 situated at the left side of the partition wall 5 in FIG. 1 are subjected to pressure and the supporting elements 2 situated at the right side of the partition wall 5 are relieved of pressure. By displacement of partition wall 5 the boundary between the supporting elements which are under pressure and the supporting elements which are relieved of pressure can be displaced from supporting element to supporting element. Although only a single supply duct and a single discharge duct is necessary for the pressure medium of the supporting elements, the working width of the deflection control roll can be varied in small steps over the entire width of the roll.

Figure 3:
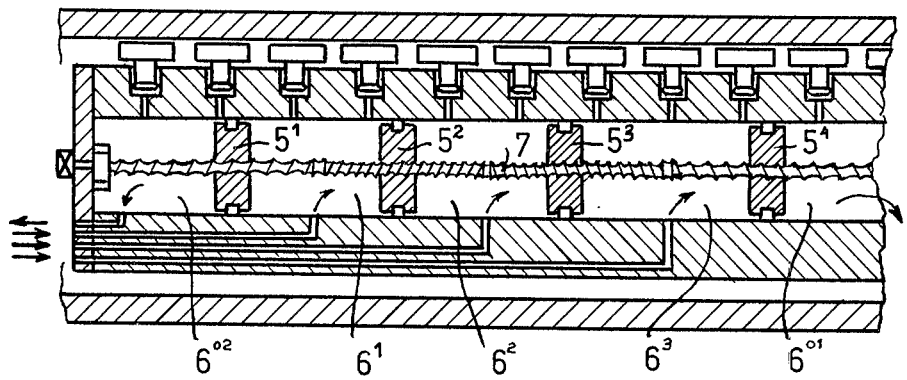
FIG. 3 shows a vertical axial section through a further constructional form.

In the constructional example shown in FIG. 3, four partition walls $5^1$ to $5^4$ are provided which engage with a common screwthreaded spindle 7. The partition wall $5^1$ and $5^2$ bound a duct $6^1$ for pressure fluid. The partition walls $5^2$ and $5^3$ define a duct $6^2$ for pressure fluid. The partition walls $5^3$ and $5^4$ define a duct $6^3$ for pressure fluid. At the right-hand side of the partition wall $5^4$ in the drawings there is situated a discharge duct $6^{01}$, and at the left side of the partition wall $5^1$ there is situated a discharge duct $6^{02}$.

The screwthreaded spindle 7 in FIG. 3 comprises four successive different kinds of screwthreaded sections. The screwthread section belonging to partition wall $5^1$ is provided with a right hand thread and has a large pitch. The screwthread section associated with the partition wall $5^2$ has a right hand thread and has a relatively small pitch. The screwthread section associated with partition wall $5^3$ is given a left hand thread and has the same relatively small pitch. The screwthread section associated with the partition wall $5^4$ is given a left hand thread and has the large pitch. If the screwthreaded spindle 7 is rotated in one direction, the partition walls $5^1$ and $5^4$ approach one another to a relatively considerable extent, whereas the partition walls $5^2$ and $5^3$ approach to a relatively small extent.

In this way the working width of the roll which is determined by the spacing of the partition walls $5^1$ and $5^4$ can be modified in small steps, that is to say from supporting element to supporting element. The ratio of the three pressure zones which correspond to the ducts $6^1$, $6^2$ and $6^3$, can be left unaltered.

Figure 4:
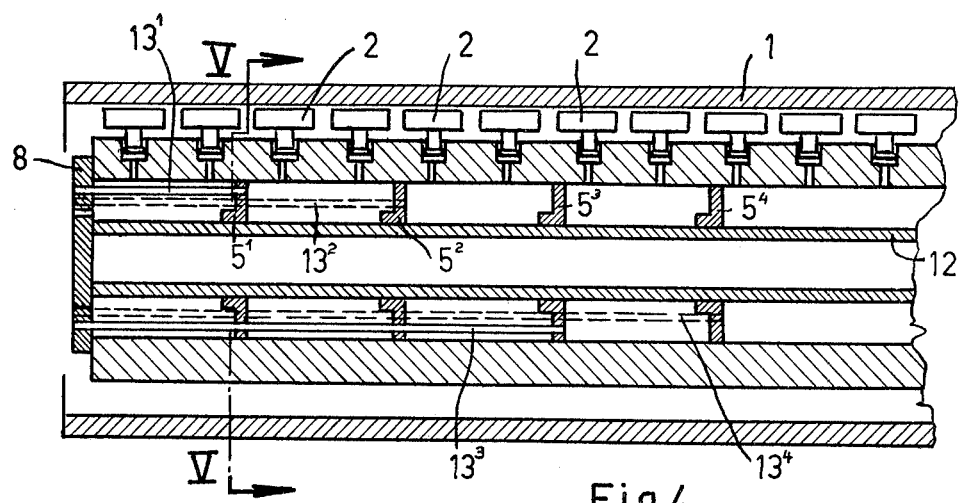
FIG. 4 shows a vertical axial section through another constructional form.

In the constructional example shown in FIG. 4 the partition walls $5^1$ to $5^4$ are arranged on an insert element 12 introduced into the supporting member 3. To displace the partition walls $5^1$ to $5^4$ the insert element 12 is taken out of the supporting member 3 and the partition walls $5^1$ to $5^4$ are displaced into the desired position and fixed on the insert element 12 by means of an adjusting screw not shown here. The ducts for supplying or discharging the pressure fluid extend through the displaceable partition walls. The ducts are each formed by a flexible tube $13^1$, $13^2$, $13^3$, $13^4$.

Figure 5:
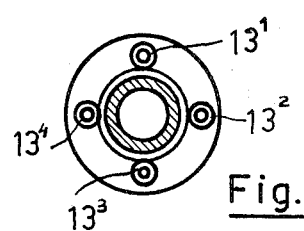
FIG. 5 shows a section taken on the line V—V of FIG. 4.

As FIG. 5 shows more particularly, the flexible tubes $13^1$, $13^2$, $13^3$, and $13^4$ extend through the partition wall $5^1$, and the flexible tube $13^1$ opens into the space between the two partition walls $5^1$ and $5^2$. The partition wall $5^2$ has the flexible tubes $13^2$, $13^3$ and $13^4$ extending through it, the flexible tube $13^2$ opening into the space between the partition wall $5^2$ and the partition wall $5^3$. Correspondingly the flexible tubes $13^3$ and $13^4$ extend through the partition wall $5^3$ and the flexible tube $13^4$ extends through the partition wall $5^4$.

If when the partition walls are displaced they are additionally rotated, the flexible tubes may become wound helically on the insert element 12, so that the flexible tubes may stick fast in the partition walls and in the cover 8 of the supporting member 3.

Figure 6:
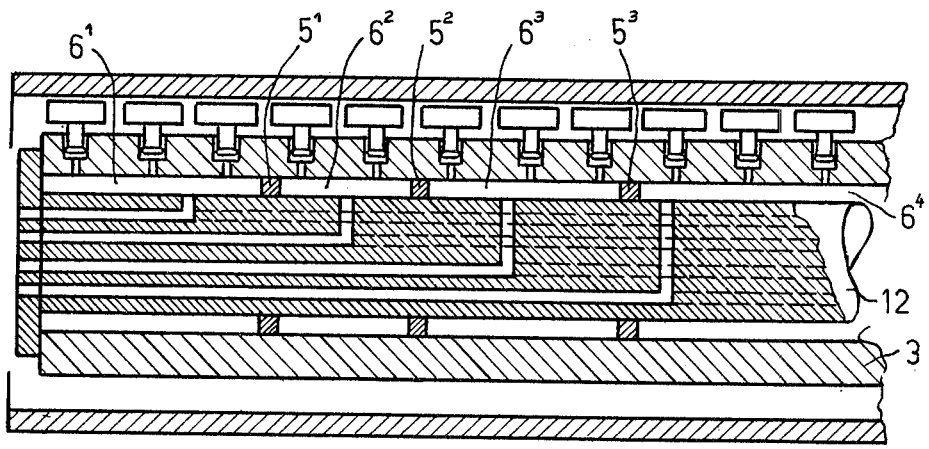
FIG. 6 shows a vertical axial section through a further constructional form.
Figure 7:
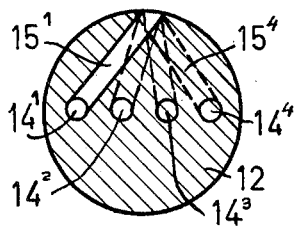
FIG. 7 shows a section taken on the line VII—VII of FIG. 6.

In the constructional example according to FIG. 6 and FIG. 7 an insert element 12 is introduced into the supporting member 3. On this element there are secured partition walls $5^1$ to $5^3$ which can be displaced after the insert element is taken out. The insert element 12 comprises four bores $14^1$, $14^2$, $14^3$ and $14^4$ which extend over its entire length. These bores $14^1$ to $14^4$ are connected with the ducts $6^1$, $6^2$, $6^3$, $6^4$ defined by the cover 8 and the partition walls $5^1$, $5^2$, $5^3$. Since the bores $14^1$ to $14^4$ extend over the entire width of the roll, bores corresponding to the connecting bores $15^1$ to $15^4$ can be arranged at each part of the width of the roll. Connecting bores which are no longer required after asjustment of the partition wall $5^1$ to $5^3$ can be closed by a plug and new connecting bores can be arranged. Thus, this constructional form is very adaptable.

Figure 8:
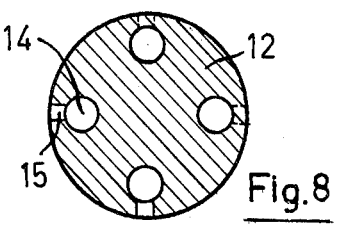
FIG. 8 shows a section corresponding to FIG. 7 through a further constructional form.

Whereas in the constructional example shown in FIG. 7 and FIG. 6 the bores 14 are situated in a line adjacent to one another, these bores 14 in the constructional example shown in FIG. 8 are arranged in a circle; in FIG. 8 the connecting bores 15 then have to lead radially outwards.

Figure 9:
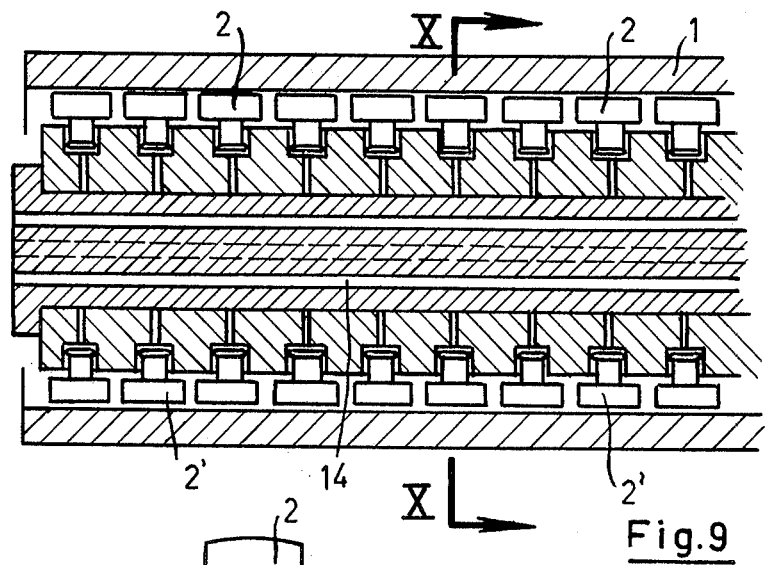
FIG. 9 shows a vertical axial section through a further constructional form.
Figure 10:
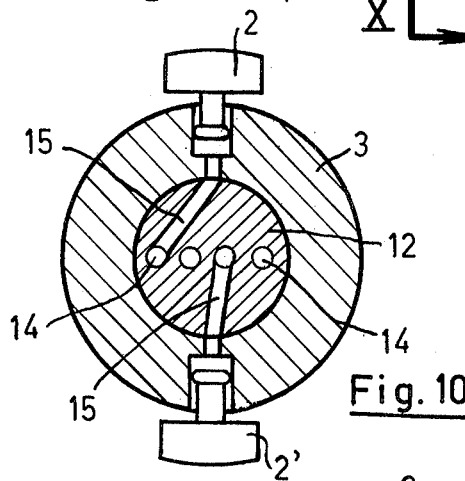
FIG. 10 shows a section taken on the line X—X of FIG. 9.

In the constructional example shown in FIG. 9 and FIG. 10 the insert element 12 has four bores 14 which extend over the entire width of the roll. The insert element 12, however, is inserted with a fit in the supporting member 3 and a separate connecting bore 15 is provided for each supporting element 2. The portions of the insert element 12 which are situated between the connecting bores 15 in this case form the "partition walls" in the sense of the present invention. By appropriate opening or closing of the connecting bores 15, these partition walls can be displaced, or, in other words, the position of these partition walls can be modified along the series of supporting elements.

The constructional form shown in FIG. 9 and FIG. 10 has the further advantage that not only one series of supporting elements can be connected to the four bores 14, but a second series of supporting elements 2' can also be connected to the same bores. Accordingly in FIG. 9, the three supporting elements 2' situated at the right in the illustration are connected to a conduit 14 which conducts pressure medium to these supporting elements. The other supporting elements 2' and the supporting elements 2 situated opposite the three supporting elements 2' supplied with pressure medium, however, are connected to a bore 14 which leads to a pressure fluid outlet. The other supporting elements 2 which are shown are connected by connecting bores to conduits 14 in which pressure fluid is supplied. In this way only the first seven supporting elements 2 situated at the left in the illustration press the shell 1 of the roll against the associated opposite roll which is not shown here, whilst the three supporting elements 2' at the right in the illustration press the shell 1 away from the aforesaid associated roll.

Figure 11:
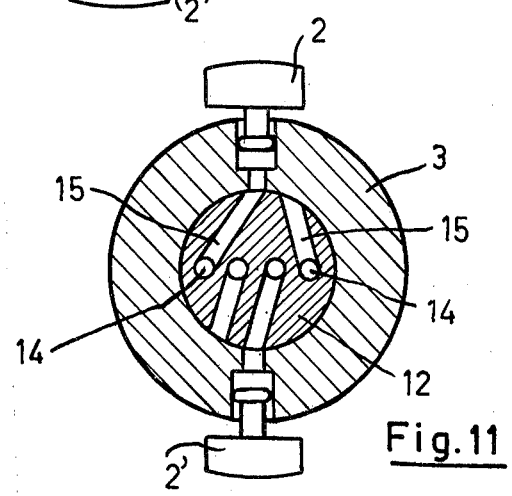
FIG. 11 shows a section corresponding to FIG. 10 through a further constructional form.

In the constructional example shown in FIG. 11 the insert element 12 is constructed to be capable of rotating. In the illustrating position, the roll operates with the same supply as the roll shown in FIG. 9 and FIG. 10. If the insert element 12 is turned in the counterclockwise direction in the drawings, the two supporting elements 2 and 2' which are illustrated are connected to other bores 14 than in the constructional example shown in FIG. 9 and FIG. 10. Thus the insert element 12 can comprise a plurality of series of connecting bores 15 which open along a generatrix, and which are brought into connection selectively with the supporting elements 2 and 2' respectively by turning the insert element 12. Thus the load pattern of the roll can be modified by simply rotating the insert element 12.

Figure 12:
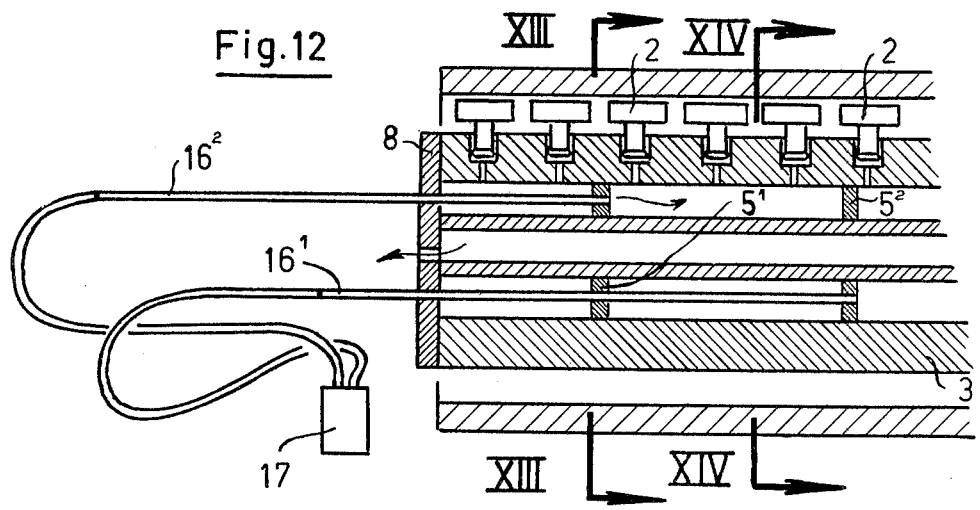
FIG. 12 shows a vertical axial section through another constructional form.
Figure 13:
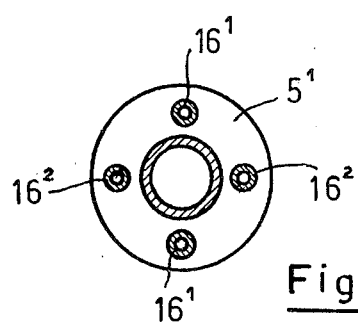
FIG. 13 shows a section taken on the line XIII—XIII of FIG. 12.
Figure 14:
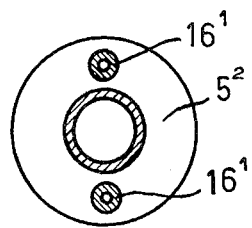
FIG. 14 shows a section taken on the line XIV—XIV of FIG. 12 and FIGS. 15 and 16 show vertical axial sections through two further constructional examples.

The constructional example shown in FIG. 12 to FIG. 14 corresponds, as regards the guiding of the pressure fluids, substantially to the constructional example which was shown in FIG. 4 and FIG. 5. However, the partition walls $5^1$ and $5^2$ can be displaced from the outside. The partition wall $5^1$ is secured to two tubes $16^1$ which run in sealing-tight fashion through the cover 8 of the supporting member 3. The partition wall $5^2$ is secured to two tubes $16^2$ which run in sealing-tight manner through the partition wall $5^1$ and in sealing-tight manner through the cover 8 of the supporting member 3. The tubes $16^1$ advantageously are all of the same length corresponding to the width of the roll, so that the partition walls $5^1$ and $5^2$ can be adjusted over the entire width of the roll, and the ends of the tubes $16^1$ and $16^2$ projecting from the roll give a representation of the position of the partition walls $5^1$ and $5^2$. Finally, the ends of the tubes $16^1$ and $16^2$ are connected by means of mobile flexible tubes to a pressure medium source 17.

Figure 15:
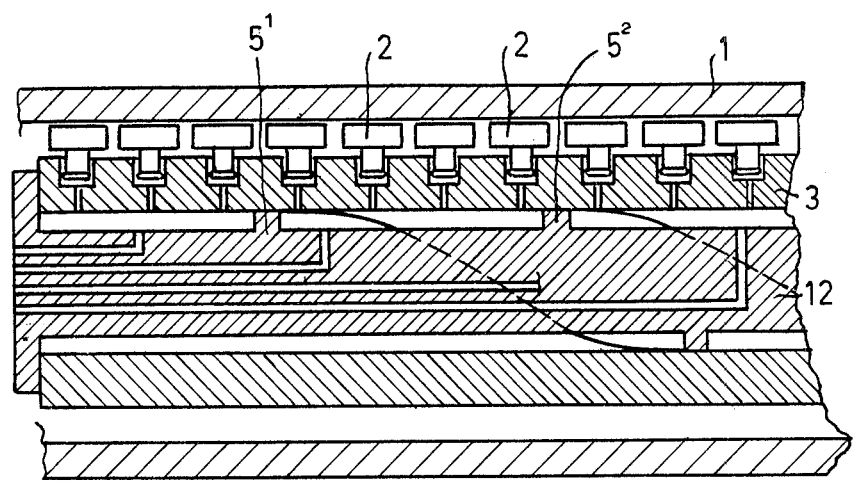

In the constructional example shown in FIG. 15, an insert element 12 is arranged in the supporting member 3 and comprises helical partition walls $5^1$ and $5^2$ which can be displaced along the series of supporting elements by rotating the insert element 12.

Figure 16:
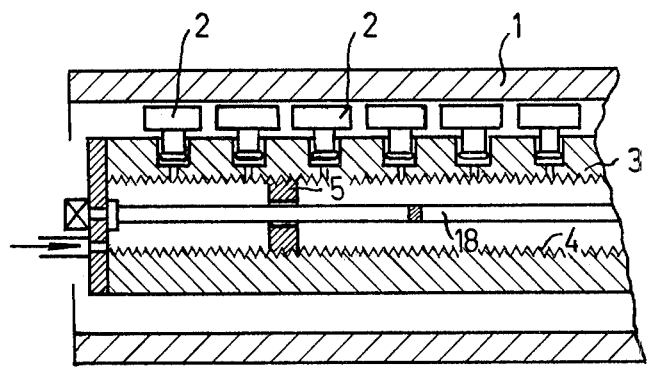

The constructional example shown in FIG. 16 corresponds substantially to that shown in FIG. 1. But the spindle 7 is replaced by a square section rod 18 and the screwthread is arranged on the periphery of the partition wall 5. Correspondingly, the bore 4 of the supporting member 3 is constructed as a screwthreaded bore in which the screwthred of the partition wall 5 engages.

I claim:

1. Deflection control device, having a stationary supporting member; said supporting member comprising a series of hydrostatic supporting elements; said device also having a shell movable transversely relatively to the series of said supporting elements; ducts being provided in said supporting member for supplying or discharging pressure fluid for said supporting elements; a partition wall separating two of said ducts from one another; the position of said partition wall being variable along the series of said supporting elements.

2. Deflection control device according to claim 1, in which said partition wall is displaceable along the series of said supporting elements.

3. Deflection control device according to claim 1, in which an insert element is arranged in said supporting member and said partition wall is arranged on said insert element.

4. Deflection control device according to claim 3, in which said insert element is removable from said supporting member, for changing the position of said partition wall, or for introducing another insert element with a changed position of said partition wall.

5. Deflection control device according to claim 2, having a rod for displacing said partition wall from the outside of said supporting element.

6. Deflection control device according to claim 5, wherein said rod is a screwthreaded spindle.

7. Deflection control device according to claim 6, in which said screwthreaded spindle is mounted axially on said supporting member and engages in a screwthreaded bore of said partition wall.

8. Deflection control device according to claim 7, with at least one other partition wall; and a common screwthreaded spindle provided for said partition walls; and said common spindle comprising successive screwthreads of different pitches and/or different directions of rotation.

9. Deflection control device according to claim 8, in which at least one of said ducts for supplying or discharging the pressure fluid extends through at least one of said partition walls.

10. Deflection control device according to claim 9, wherein a flexible tube forms at least a part of at least one of said ducts.

11. Deflection control device according to claim 9, wherein a rigid tube forms at least one of said ducts.

12. Deflection control device accoring to claim 1, in which said partition wall follows a helical course.

* * * * *